US012329061B2

United States Patent
Focks et al.

(10) Patent No.: US 12,329,061 B2
(45) Date of Patent: Jun. 17, 2025

(54) CUTTING DEVICE

(71) Applicant: Maschinenfabrik Bernard Krone GmbH & Co. KG, Spelle (DE)

(72) Inventors: Tobias Focks, Spelle (DE); Markus Ester, Beesten (DE); Martin Bolsmann, Andervenne (DE); Frank Ahlmer, Westerkappeln (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 511 days.

(21) Appl. No.: 17/380,503

(22) Filed: Jul. 20, 2021

(65) Prior Publication Data
US 2022/0022372 A1     Jan. 27, 2022

(30) Foreign Application Priority Data

Jul. 22, 2020   (DE) ..................... 10 2020 119 368.8

(51) Int. Cl.
*A01D 34/412*     (2006.01)
*A01D 34/63*     (2006.01)
*A01D 34/66*     (2006.01)

(52) U.S. Cl.
CPC .......... *A01D 34/412* (2013.01); *A01D 34/63* (2013.01); *A01D 34/664* (2013.01)

(58) Field of Classification Search
CPC .... A01D 34/412; A01D 45/002; A01D 57/30; A01B 23/06; A01B 15/16
See application file for complete search history.

(56) References Cited

U.S. PATENT DOCUMENTS

| | | | | |
|---|---|---|---|---|
| 2,115,265 A | * | 4/1938 | Jennett | A01G 3/0535 30/292 |
| 2,321,387 A | * | 6/1943 | Jackson | A01D 45/002 198/611 |
| 2,527,472 A | * | 10/1950 | Wolf | A01D 34/63 56/192 |
| 2,917,826 A | * | 12/1959 | Pohr | A01G 3/062 56/295 |
| 3,014,333 A | * | 12/1961 | Clark, Jr. | A01D 34/73 56/13.4 |

(Continued)

FOREIGN PATENT DOCUMENTS

| | | | | |
|---|---|---|---|---|
| BE | | 901431 A | * 5/1985 | ........... A01D 34/412 |
| BE | | 1023102 B1 | * 11/2016 | |

(Continued)

*Primary Examiner* — Matthew Troutman
*Assistant Examiner* — Ashley A Kaercher
(74) *Attorney, Agent, or Firm* — Gudrun E. Huckett

(57) ABSTRACT

A cutting device is embodied for cutting agricultural crop plants by a rotational movement about a cutting rotation axis and has at least one knife element that, in a plan view of a top side of the cutting device, is embodied open in circulating direction. At least one radial conveying element, arranged at least at the top side and stationary relative to the knife element, is provided that at least in sections thereof is embodied for conveying the crop plants in a conveying direction that, relative to the cutting rotation axis, is oriented partly tangentially and partly radially relative to the cutting rotation axis. Moreover, a harvesting attachment with a plurality of such cutting devices and a field chopper with such a harvesting attachment is provided.

20 Claims, 8 Drawing Sheets

(56) References Cited

U.S. PATENT DOCUMENTS

| | | | | |
|---|---|---|---|---|
| 3,078,573 | A | * | 2/1963 | Kern .................. A01D 34/73 56/295 |
| 3,466,858 | A | * | 9/1969 | Donkelaar ........... A01D 34/63 56/295 |
| 3,482,380 | A | * | 12/1969 | Stair ................ A01D 34/736 144/34.1 |
| 3,979,889 | A | * | 9/1976 | Vansteelant ........... A01D 43/10 56/192 |
| 4,019,308 | A | * | 4/1977 | Quick .................. A01D 45/10 56/60 |
| 4,083,166 | A | * | 4/1978 | Haas ................. A01D 34/005 56/503 |
| 4,172,350 | A | * | 10/1979 | Vejux ................ A01D 34/53 56/294 |
| 4,189,903 | A | * | 2/1980 | Jackson ............. A01D 34/005 56/255 |
| 4,369,618 | A | * | 1/1983 | Dell .................. A01D 34/73 56/295 |
| 4,543,774 | A | * | 10/1985 | Arnold .............. A01D 43/082 56/13.6 |
| 5,561,972 | A | * | 10/1996 | Rolfe ............... A01D 34/736 56/DIG. 17 |
| 6,318,055 | B1 | * | 11/2001 | Bird ................ A01D 43/10 56/13.6 |
| 8,056,307 | B2 | * | 11/2011 | Roberge ............. A01D 41/144 56/6 |
| 2009/0205305 | A1 | * | 8/2009 | Koorn ............... A01D 34/828 56/289 |
| 2013/0219847 | A1 | * | 8/2013 | Miller ............... A01D 43/08 56/156 |
| 2015/0164000 | A1 | * | 6/2015 | Schrattenecker .... A01D 45/021 56/102 |
| 2016/0330904 | A1 | * | 11/2016 | Weitenberg .......... A01B 73/044 |
| 2021/0251144 | A1 | * | 8/2021 | Rickards ............ A01D 34/412 |
| 2022/0022372 | A1 | * | 1/2022 | Focks ................ A01D 45/021 |

FOREIGN PATENT DOCUMENTS

| | | | | |
|---|---|---|---|---|
| BR | 202017011521 | U2 | * 12/2018 | .......... A01D 45/10 |
| BR | 102019011487 | A2 | * 12/2019 | .......... A01D 43/082 |
| CA | 2937639 | A1 | * 1/2018 | .......... A01D 34/13 |
| CN | 106472002 | A | * 3/2017 | .......... A01D 45/065 |
| CN | 108200796 | A | * 6/2018 | |
| CN | 108377715 | A | * 8/2018 | .......... A01D 34/412 |
| CN | 109362324 | A | * 2/2019 | .......... A01D 34/412 |
| CN | 110692354 | A | * 1/2020 | |
| CN | 110999623 | A | * 4/2020 | |
| CN | 112335396 | A | * 2/2021 | |
| CN | 112772109 | A | * 5/2021 | |
| CN | 112997672 | A | * 6/2021 | .......... A01D 34/008 |
| CN | 113973572 | A | * 1/2022 | |
| DE | 41 09 064 | | 9/1992 | |
| DE | 19535453 | A1 | * 3/1997 | .......... A01D 43/082 |
| DE | 196 39 805 | | 5/1997 | |
| DE | 19639805 | A1 | * 5/1997 | .......... A01D 43/082 |
| DE | 19628195 | A1 | * 1/1998 | .......... A01D 43/082 |
| DE | 10026495 | A1 | * 11/2001 | .......... A01D 43/082 |
| DE | 101 03 595 | | 6/2002 | |
| DE | 10103595 | C1 | * 6/2002 | .......... A01D 43/082 |
| DE | 10151849 | A1 | * 5/2003 | .......... A01D 41/144 |
| DE | 19734747 | B4 | * 2/2005 | .......... A01D 45/021 |
| DE | 10351858 | A1 | * 6/2005 | .......... A01D 43/082 |
| DE | 20122375 | U1 | * 6/2005 | .......... A01D 43/082 |
| DE | 102006020792 | A1 | * 11/2007 | .......... A01D 41/144 |
| DE | 102008035191 | A1 | * 2/2010 | .......... A01D 43/082 |
| DE | 102013004858 | A1 | * 9/2014 | .......... A01D 43/082 |
| DE | 102013209730 | A1 | * 11/2014 | .......... A01D 43/082 |
| DE | 112014003477 | T5 | * 5/2016 | .......... A01D 34/664 |
| DE | 102016214323 | A1 | | 2/2018 | |
| DE | 102016214324 | A1 | | 2/2018 | |
| DE | 102017206034 | A1 | * 10/2018 | |
| DE | 102019113350 | A1 | * 11/2020 | .......... A01D 43/082 |
| EP | 896789 | A1 | * 2/1999 | .......... A01D 45/021 |
| EP | 1305999 | A1 | * 5/2003 | .......... A01D 43/082 |
| EP | 1495664 | A1 | * 1/2005 | .......... A01D 43/082 |
| EP | 1543714 | A2 | * 6/2005 | .......... A01D 43/082 |
| EP | 1862057 | A1 | * 12/2007 | .......... A01D 43/082 |
| EP | 1980144 | A1 | * 10/2008 | .......... A01D 80/02 |
| EP | 1922915 | B1 | * 2/2010 | .......... A01D 43/082 |
| EP | 2255610 | B1 | * 6/2013 | .......... A01D 45/021 |
| EP | 2781148 | A1 | * 9/2014 | .......... A01D 43/082 |
| EP | 2727457 | B1 | * 7/2015 | .......... A01D 34/664 |
| EP | 2923556 | A2 | * 9/2015 | .......... A01D 45/021 |
| EP | 3 130 214 | | 2/2017 | |
| EP | 3130214 | A1 | * 2/2017 | .......... A01D 43/082 |
| EP | 2910103 | B1 | * 1/2018 | .......... A01D 90/04 |
| EP | 3837949 | A1 | * 6/2021 | .......... A01D 34/008 |
| EP | 3942919 | A1 | * 1/2022 | .......... A01D 34/412 |
| GB | 1516875 | A | * 7/1978 | .......... A01D 34/71 |
| GB | 2186779 | A | * 8/1987 | .......... A01D 34/412 |
| HU | 216173 | B | * 4/1999 | .......... A01D 43/082 |
| HU | 230211 | B1 | * 10/2015 | .......... A01D 34/664 |
| JP | 2017212967 | A | * 12/2017 | .......... A01D 41/02 |
| NL | 8502803 | A | * 5/1987 | .......... A01D 34/664 |
| RU | 2018112299 | A | * 10/2019 | .......... A01D 34/73 |
| WO | WO-9217997 | A1 | * 10/1992 | .......... A01D 34/73 |
| WO | WO-9322897 | A1 | * 11/1993 | .......... A01D 34/73 |
| WO | WO-03105566 | A1 | * 12/2003 | .......... A01D 34/664 |

\* cited by examiner

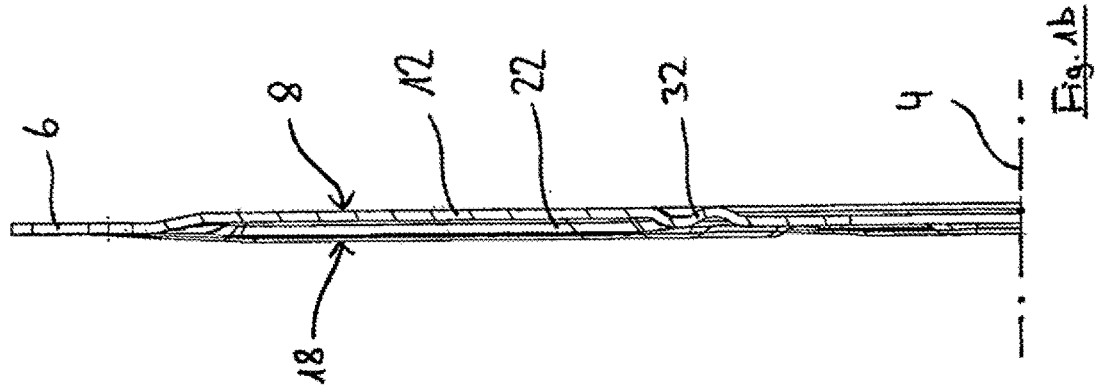
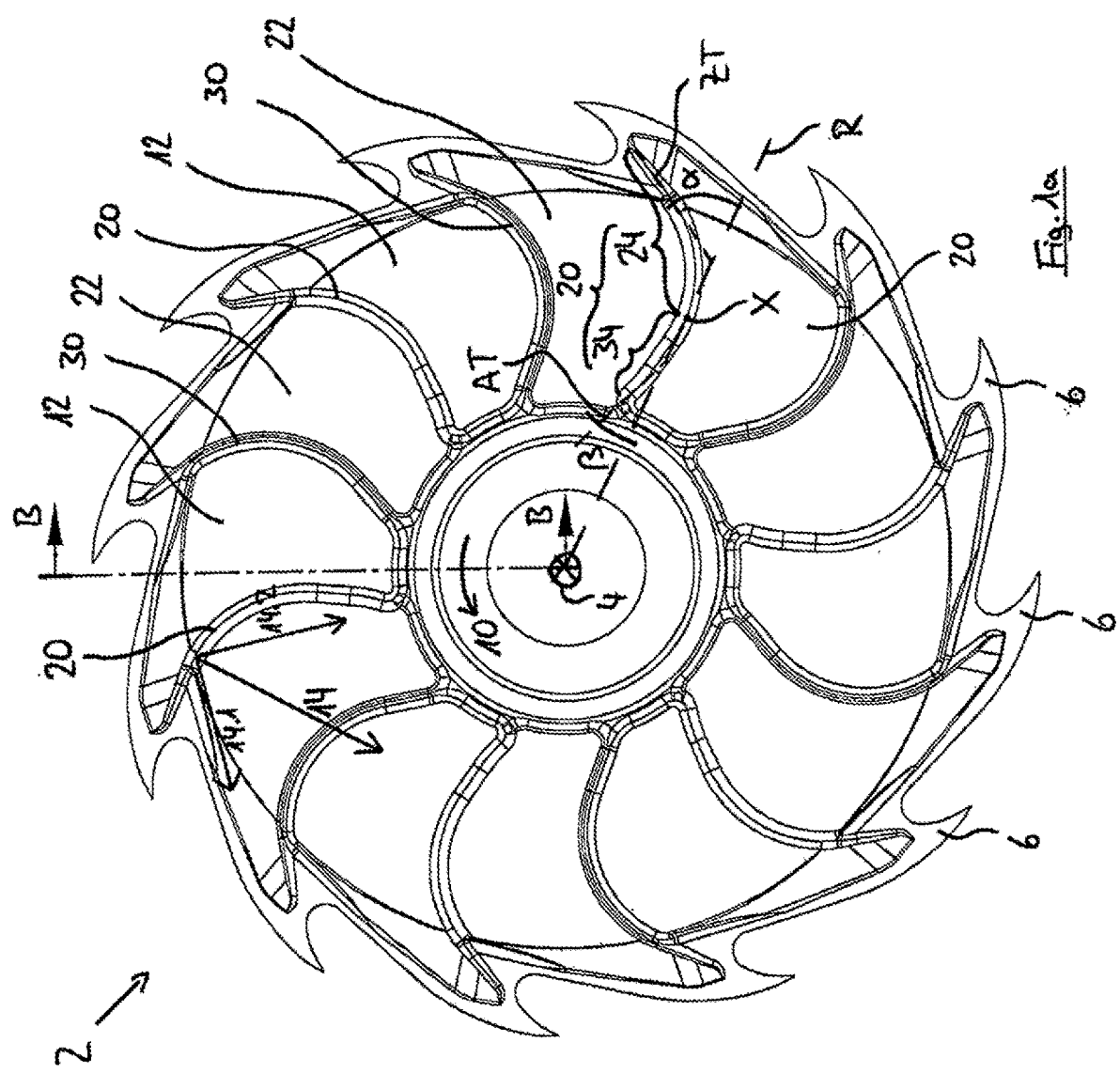

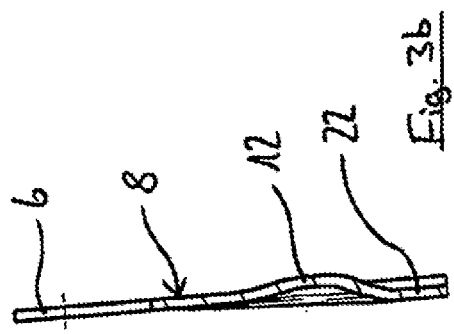
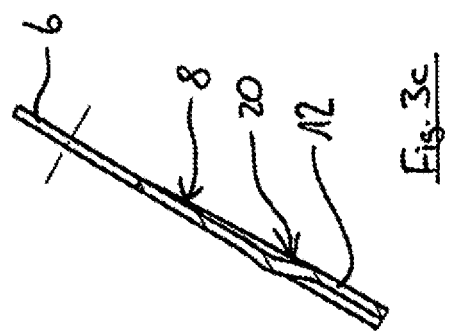
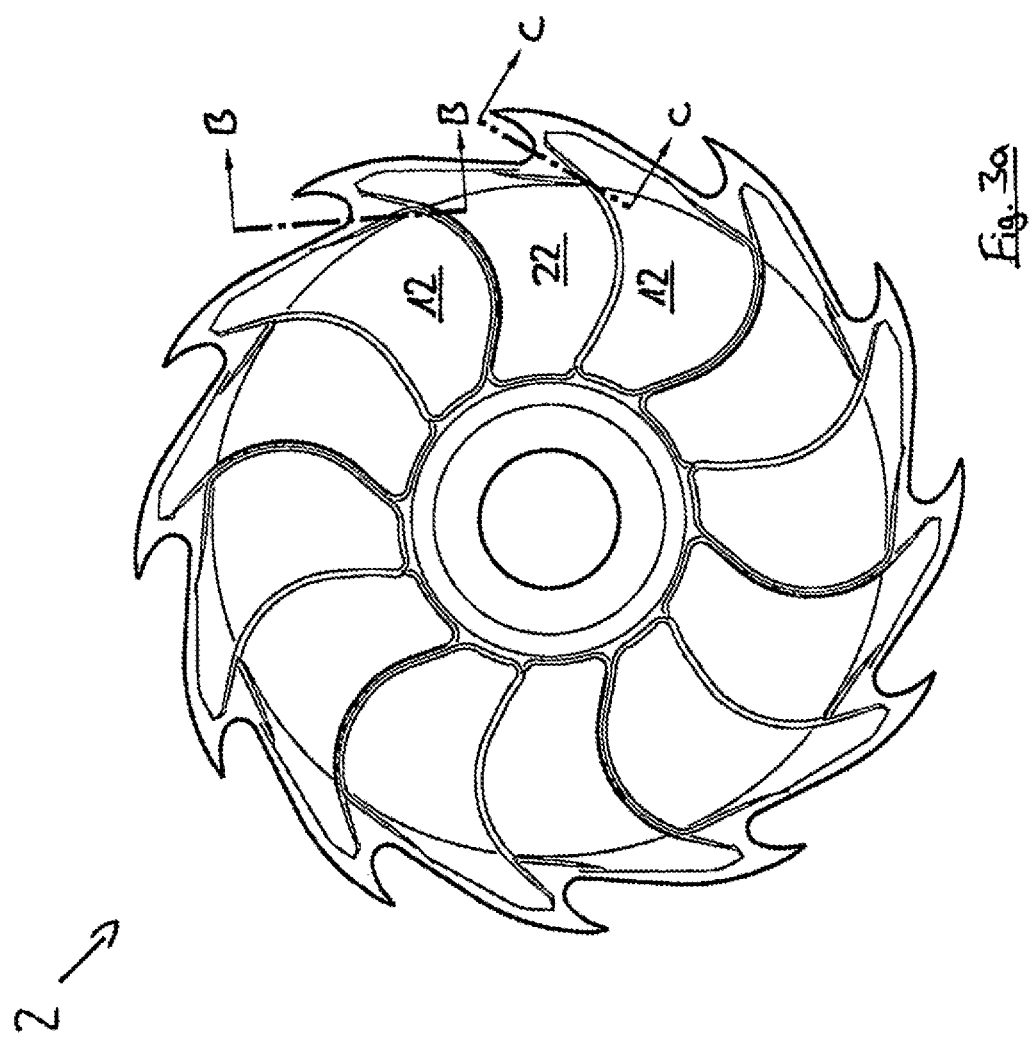

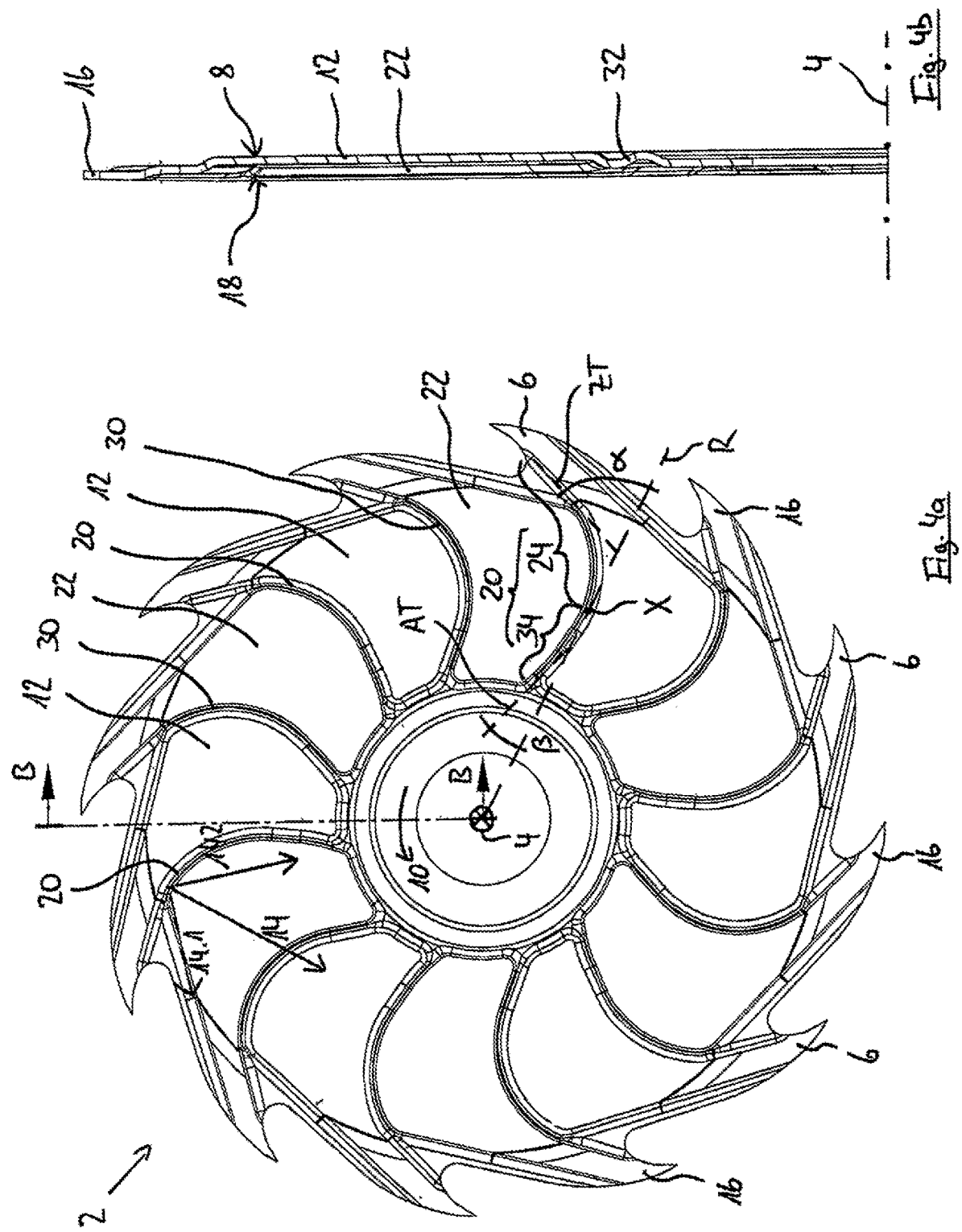

CUTTING DEVICE

BACKGROUND OF THE INVENTION

The invention concerns a cutting device that is embodied for cutting agricultural crop plants by a rotational movement about a cutting rotation axis. The cutting device comprises at least one knife element. In a plan view of a top side of the cutting device, the knife element is embodied open in a circulating direction.

Such a cutting device is disclosed in EP 3 130 214 A1. The known cutting device is to be mounted for its operation on a harvester or a part thereof. In operation, the cutting device rotates about the cutting rotation axis and is moved in a travel direction that is angled relative to the cutting rotation axis toward the crop plants to be cut. In doing so, the at least one cutting element cuts through the crop plants.

A disadvantage of the known cutting device is that, at greater movement speeds, the cut crop plants accumulate on the top side of the cutting device and, depending on the harvesting conditions, fall off the cutting device in the travel direction onto the soil of the field which causes crop losses.

Moreover, such cutting devices have a high cross section so that they exhibit a sufficient resistance moment in order not to deform in operation. The deformation could lead to neighboring cutting devices contacting each other and mutually destroy each other. Due to the high cross section, the weight of such cutting devices is however high which causes a relatively high wear and also high costs in regard to fuel consumption.

Object of the present invention is providing a cutting device of the aforementioned kind which avoids the afore described disadvantages as well as a harvesting attachment and a field chopper, each with the cutting device.

SUMMARY OF THE INVENTION

According to the invention, the object is solved by a cutting device of the aforementioned kind that comprises at least one radial conveying element that is arranged at least at the top side and is stationary relative to the knife element. The radial conveying element is embodied at least in sections thereof for conveying the crop plants in a conveying direction. The conveying direction is oriented relative to the cutting rotation axis partly tangentially and partly radially to the cutting rotation axis. The conveying direction is in particular a resultant of a conveying direction proportion oriented tangentially in the circulating direction and a conveying direction proportion facing radially toward the cutting rotation axis.

The cutting device is embodied in particular as cutting disk or as cutting disk segment. As cutting disk, the cutting device has preferably a bore through which the cutting rotation axis extends and in the region of which the cutting device is to be fastened to a support or drive device. As cutting disk segment, the cutting device in the plan view is delimited in particular by at least two contours that extend, regardless of the knife element, substantially in circulating direction as well as two contours extending in radial direction. The cutting device is preferably monolithically embodied.

The cutting device comprises preferably a plurality of knife elements which extend along an outer circumference of the cutting device or adjoin each other in circulating direction. The at least one knife element forms in particular a cutting edge. Due to a preferred sickle shape in sections, the knife element tapers preferably in circulating direction or in tangential direction. A cutting edge orthogonal line oriented at a right angle to at least a part of the cutting edge extends preferably, beginning at the cutting edge, away from the knife element and in part toward the cutting rotation axis. The cutting edge extends with increasing radius in the circulating direction. Due to this configuration of the knife element or of the cutting edge, it is prevented that the cut crop plants are pushed away by the cutting device in the travel direction. The preferred sickle shape ensures that a pressure force acts partially against the travel direction on the crop plants while they are being cut. In this way, the crop plants first reach reliably the top side and thus the action range of the radial conveying element. It is also possible that the cutting device is formed of tooth-shaped knife elements which have a constant angle to the radial.

The radial conveying element is arranged at the top side inasmuch as it is visible in the plan view of the top side. The top side is preferably substantially planar and embodied at a right angle to the cutting rotation axis. By means of the radial conveying element it is achieved that in operation the cut crop plants, already by the rotating cutting device, are moved at least partially toward the cutting rotation axis. Accumulation of cut crop plants on the cutting device and an impairment caused thereby of the further cutting action or a loss of crop are thus prevented and in particular a quick material flow from the knife elements to a follower, which is not part of the invention, above the cutting elements is ensured.

Preferably, the radial conveying element adjoins, along a conveying contour, an intermediate element arranged upstream in the circulating direction. A conveying section of the conveying contour extends from a neutral conveying point X preferably partly in the circulating direction and partly in radial direction away from the cutting rotation axis. At the neutral conveying point, the conveying contour extends in particular exclusively in the radial direction and/or the conveying direction exclusively in the tangential direction. The neutral conveying point is alternatively or additionally preferably the point of the conveying section that is arranged in relation to the circulating direction farthest to the rear. Viewed in the plan view, in particular a conveying contour orthogonal line, which is at a right angle to at least a part of the conveying contour, extends away from the conveying contour partly toward the cutting rotation axis. The conveying contour orthogonal line is in particular parallel to or lies in the conveying direction.

In particular, the intermediate element as well as the radial conveying element is spaced apart from the cutting rotation axis as well as from an outer circumference of the cutting device. Particularly preferred, the cutting device comprises a plurality of radial conveying elements and a plurality of intermediate elements which are arranged alternately in circulating direction. In the plan view, the conveying contour describes that at least substantially linear boundary region that is between the at least one radial conveying element and the at least one intermediate element. The intermediate element and/or the radial conveying element at the top side and/or at the oppositely position side are preferably at least mostly of a planar configuration wherein this part preferably extends orthogonally to the cutting rotation axis. The conveying section of the conveying contour is that part of the conveying contour that effects conveying of the cut crop plants in the conveying direction.

Preferably, the radial conveying element at least in sections thereof is embodied to project relative to the intermediate element in axial direction by at least 1 mm, preferably by at least 3 mm, particularly preferred by at least 6 mm. The axial direction relates to the cutting rotation axis. Due to this configuration of the radial conveying element in connection with the gravity-caused contact of the crop plants on the top side, a particularly reliable conveying thereof in the conveying direction is achieved.

The transition from the intermediate element to the radial conveying element bridging in particular the height difference is preferably designed smooth so that the surface of the cutting device, when rotated, increases gradually. Near the knife element, the height difference between the intermediate element and the radial conveying element preferably decreases with increasing radius or both pass preferably into a region of medium height. Preferably, the knife element in a view of the cutting device in radial direction is arranged between a top part of the radial conveying element and a bottom part of the intermediate element and is arranged at medium height. In particular, only the knife elements extend to the outer radius of the cutting device. Due to this configuration of the cutting device or of the radial conveying elements, an optimal action thereof on the cut crop plants is realized without the function of the knife elements being impaired.

In an advantageous embodiment of the invention, a material thickness of the intermediate element measured in the axial direction matches at least substantially a material thickness of the radial conveying element measured in axial direction. Preferably, a material thickness of the knife element measured in axial direction also substantially corresponds therewith. The material thickness amounts preferably to between 1 mm and 10 mm, particularly preferred between 2 mm and 6 mm, in particular substantially 3 mm. In a preferred embodiment, the intermediate element and/or the radial conveying element beginning at least in the region of medium height of the cutting device are corrugated regions of the cutting device. In this way, the radial conveying element and/or the intermediate element are raised or lowered relative to the region of medium height. The region of medium height can be, for example, a mounting region of the cutting device formed at an inner radius of the cutting device. Introducing such corrugations is possible by embossing, for example, starting with a flat sheet produced monolithically in particular from a flat band material. By introducing the corrugations, the resistance moment of the cutting device is increased so that the cross section of the cutting device can be reduced significantly. A reduction of the cross section in a range of magnitude of up to 40% in comparison to conventional cutting devices can be achieved. Due to the thus significantly reduced weight of the cutting device, the cutting forces and the starting torque are reduced so that a significant fuel savings is possible for a harvester driving such cutting devices. In this way, the radial conveying element as will as an increased stability of the cutting device can be realized with only minimal material expenditure.

The cutting device comprises preferably at least one mounting bore which is arranged in particular in the radial conveying element or the intermediate element and extends parallel to the cutting rotation axis through the material. In particular, the cutting device comprises at least two pairs of such mounting bores. They serve for arranging tools at the cutting device that serve for fraying the rooted crop plant parts remaining on the field and/or removing deposits above the cone holders of a harvesting attachment comprising the cutting device.

Preferably, the conveying section in the plan view is designed in an arc shape such that a conveying angle α between the conveying section and a radial intersecting the neutral conveying point increases with increasing radius. The conveying angle α is measured in particular at a point of intersection of the radial with a conveying tangent line that is contacting the conveying section and increases with a distance of the contact point of the conveying tangent line at the conveying section away from the cutting rotation axis, wherein also the point of intersection of the radial with the conveying tangent line moves away from the cutting rotation axis. The conveying angle α preferably does not increase beyond 90° and varies particularly preferred across an angle range of 0° to 90°. The conveying section extends preferably with increasing distance to the cutting rotation axis with increasing proportion in the circulating direction. Due to this configuration of the conveying section or of the conveying contour, the cut crop plants can be accelerated gradually in the conveying direction in operation and thus finally a conveying action as encompassing as possible can be achieved.

In a preferred embodiment of the invention, the conveying contour has a discharge section extending partly opposite to the circulating direction and partly in radial direction away from the cutting rotation axis. The discharge section is in particular arranged between the cutting rotation axis and the conveying section. In particular, the discharge section extends also in an arc shape and/or passes smoothly into the conveying section. Preferably, the discharge section and the conveying section adjoin each other at the neutral conveying point. In relation to the radial that intersect the neutral conveying point, the neutral conveying point in particular constitutes an inflection point at which the sign of the extension proportion of the conveying contour in the tangential direction reverses. A discharge angle β which is measured in analogy to the conveying angle α varies preferably across an angle range of 10° to 30°. The discharge section extends to a radius up to which the cut crop plants are to be conveyed in radial direction in order to be picked up there by the follower. A further conveyance of the crop plants, in particular husks of the crop plants that are regularly not engaged by the follower, in the direction of the cutting rotation axis caused winding around the drive axis of the cutting device which disturbs the operation of the cutting device or blocks it in an extreme case. The discharge section effects a conveyance of crop plant parts which have come too close to the cutting rotation axis away from the cutting rotation axis in order to avoid this disadvantageous effect. Preferably, the radial conveying element or the conveying contour is embodied at least in sections in a sickle shape.

Preferably, the cutting device comprises a plurality of knife elements wherein at least every fourth, in particular at least two knife elements, has correlated therewith a radial conveying element. In particular, precisely every second knife element has a radial conveying element correlated therewith. A conveying section of the at least one radial conveying element extends preferably toward the knife element with which it is correlated or its cutting edge. In particular, a cutting edge of the respective knife element forms an extension of the arc shape of the conveying contour.

In an advantageous embodiment of the invention, the cutting device is embodied for mounting in a first mounting position as well as for mounting in a second mounting position. In the first mounting position, the top side which is here forming a first top side is oriented at least partly upwardly. In the second mounting position, a second top side of the cutting device which is positioned opposite to the first top side is at least partly oriented upwardly. The position of the cutting rotation axis is preferably identical in both mounting positions in operation. Due to the two mounting positions, the cutting device is in particular designed as a reciprocal cutting disk or reciprocal cutting disk segment which, in operation, can be operated in both rotational directions, viewed from the support or drive device at which they or it is to be arranged. In particular, identically embodied cutting devices according to the invention can be arranged at the left half of the harvesting attachment as well as at the right half of the harvesting attachment, wherein the left half is designed for conveying of the cut crop plants to the right and the right half for conveying the cut crop plants to the left in order to supply them to a centrally arranged crop channel. Due to this configuration of the cutting device according to the invention, the latter has the significant advantage, while the advantages provided by the sickle-shaped knife elements and the radial conveying element are maintained, that is usable universally and the operator must not stock different cutting devices of the aforementioned kind as replacement parts for the same machine.

Preferably, the intermediate element adjoins along an intermediate contour a further radial conveying element which is arranged upstream in the circulating direction. In the plan view of the (first) top side, the course of the intermediate contour matches in particular the course of the conveying contour. The match is in this context independent of the ascent or descent of the conveying contour in the circulating direction. The intermediate contour is in particular arc-shaped in the same manner as the conveying contour and is arranged relative to the latter preferably only by being pivoted about the cutting rotation axis.

Particularly preferred, in axial direction opposite to the intermediate contour at the first top side, a conveying contour is formed at the second top side. In particular, the radial conveying element provided in the first mounting position forms in the second mounting position an intermediate element and the intermediate element provided in the first mounting position forms a radial conveying element in the second mounting position. Preferably, the intermediate element and the radial conveying element (in one of the mounting positions) have substantially the same shape in the plan view and are in particular at least substantially kidney-shaped. In particular, the intermediate element and the radial conveying element have a matching tangential and/or radial extension.

Preferably, at least one part of a cutting edge of a first knife element relative to at least one part of a cutting edge of a second knife element that is arranged adjacent in circulating direction is arranged displaced in axial direction. In particular, both knife elements have a matching material thickness measured in axial direction that amounts to preferably between 1 mm and 6 mm, in particular 3 mm. Viewed in tangential direction, the knife elements are in particular arranged displaced such that between the two knife elements a free space remains. This free space has in particular an axial extension of 3 mm. In operation, the crop plant is now preferably cut by a plurality of knife elements partly, respectively, wherein due to the afore described displacement of the knife elements a cutting width or height is produced that surpasses the material thickness of the cutting device or of its knife elements. In this way, independent of the mounting position, it is avoided that the crop plants to be conveyed are pushed by the radial conveying element in the travel direction. The radial conveying element has preferably a height that is the same or higher than the height of the knife elements, measured respectively in axial direction. In this embodiment, the radial conveying element is preferably correlated with the lower knife element.

Preferably, a groove extending circumferentially in circulating direction is arranged between the cutting rotation axis and the radial conveying element. By it, mechanical tensions within the cutting device are reduced and thereby its fail safety is increased.

The object is further solved by a harvesting attachment for agricultural harvesters, in particular for harvesting stalk crop such as corn or grain. The harvesting attachment comprises a plurality of rotatably supported cutting devices as described above and/or below. Their cutting rotation axes are spaced apart from each other in a transverse direction. Moreover, the harvesting attachment comprises at least one follower device circulating in operation with follower elements arranged at least in operation above the cutting devices for conveying the cut crop plants in the transverse direction. The cutting rotation axes in this context are preferably arranged parallel to each other. The transverse direction is in particular horizontal and at a right angle to at least one cutting rotation axis. Follower rotation axes about which the follower device preferably circulates are in particular at most slightly angled relative to the at least one cutting rotation axis in a side view. In particular, the harvesting attachment comprises for each row of corn to be harvested precisely one cutting device or precisely two cutting devices. This means in particular that the cutting rotation axes are spaced apart from each other by at least substantially 75 cm or 37.5 cm. It is also conceivable that each cutting device has correlated therewith a rotating follower device that is arranged coaxial to the cutting rotation axis. With this harvesting attachment, the afore described advantages of the cutting device according to the invention can be best realized in operation.

Preferably, the conveying contour, in particular the conveying section, at least of one cutting device is arranged at least partly upstream of the follower device in a driving direction for harvesting which is in particular the same as the travel direction. Preferably, the conveying contour or the conveying section extends to a point below the follower elements. The follower device comprises in particular a link chain that is circulating in operation whose chain links at least partially comprise at least one follower element. The harvesting attachment comprises in particular at least two such link chains. At least one part of the chain links comprises at least two follower elements arranged on top of each other.

In operation, the crop plants, after they have been cut, are conveyed by the radial conveying element opposite to the driving direction for harvesting to the follower device and by the latter subsequently conveyed farther in the transverse direction. By means of the two follower elements arranged on top of each other, conveyance is particularly operationally safe.

The object is further solved by a field chopper with a harvesting attachment as described above and/or below. The field chopper has in particular a plurality of drive wheels and a motor.

BRIEF DESCRIPTION OF THE DRAWINGS

Further details and advantages of the invention can be taken from the schematically illustrated embodiments described in the following.

FIG. 1a shows a first embodiment of the cutting device according to the invention in a plan view.

FIG. 1b shows the first embodiment in a partially illustrated cross section according to auxiliary line B in FIG. 1a.

FIG. 3a shows the first embodiment in the plan view.

FIG. 3b shows the first embodiment in a first partial section according to auxiliary line B in FIG. 3a.

FIG. 3c shows the first embodiment in a second partial section according to auxiliary line C in FIG. 3a.

FIG. 4a shows a second embodiment of the cutting device according to the invention in a plan view.

FIG. 4b shows the second embodiment in a partially illustrated cross section according to auxiliary line B in FIG. 4a.

FIG. 6a shows the second embodiment in the plan view.

FIG. 6b shows the second embodiment in a first partial section according to auxiliary line B in FIG. 6a.

FIG. 6c shows the second embodiment in a second partial section according to auxiliary line C in FIG. 6a.

DESCRIPTION OF PREFERRED EMBODIMENTS

Figure 2:
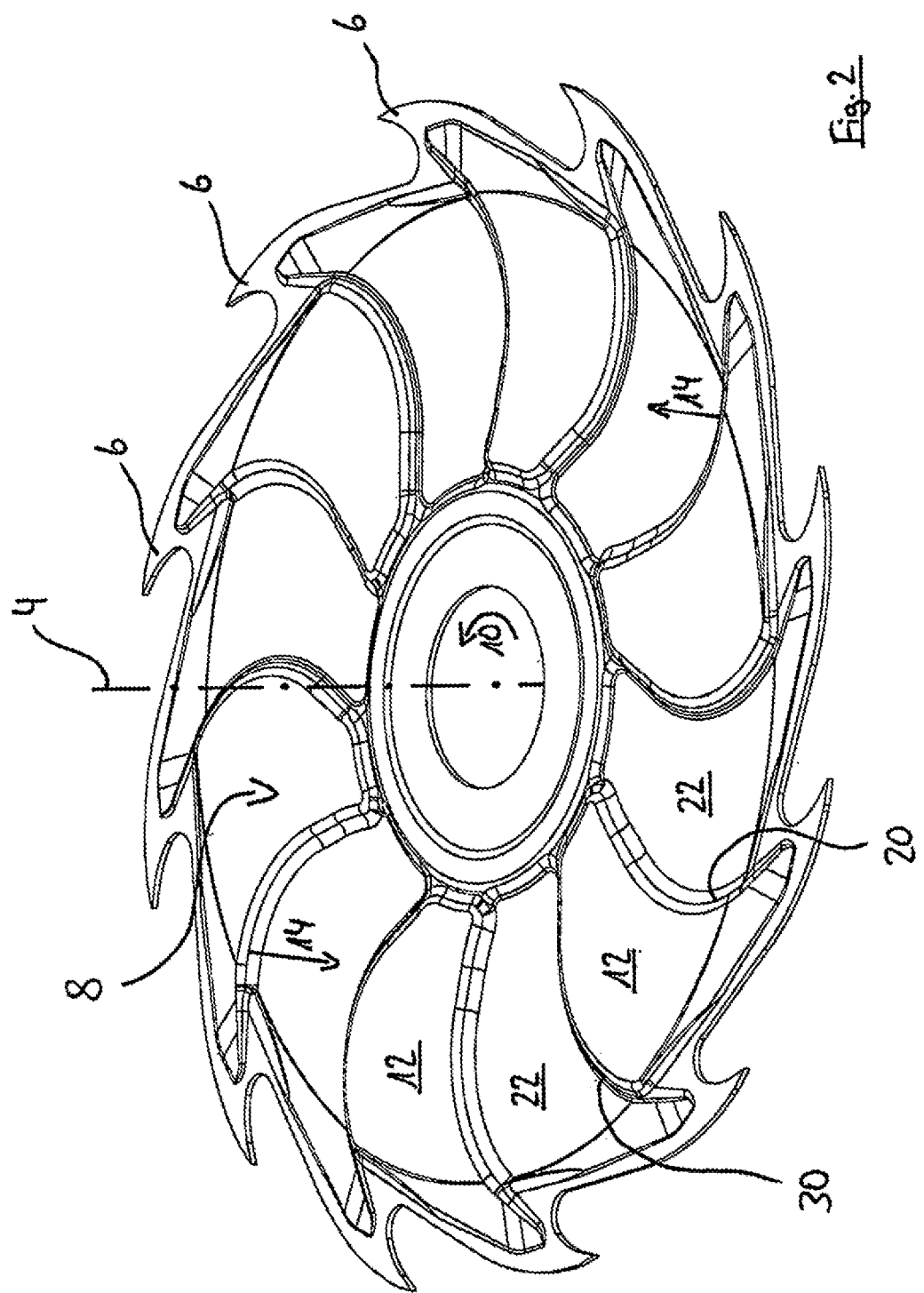
FIG. 2 shows the first embodiment in a perspective view.

The features of the embodiments according to the invention explained in the following can also be subject matter of the invention individually or in other combinations than illustrated or described, but always at least in combination with the features of the independent claim. If expedient, functionally identically acting parts are provided with identical reference characters.

FIG. 1a and FIG. 4a show different embodiments of a cutting device 2 according to the invention. In both embodiments, the cutting device 2 is embodied for cutting agricultural crop plants by a rotational movement about a cutting rotation axis 4. The illustrated cutting devices 2 comprises a plurality of knife elements 6, 16 which, in the plan views of the top side 8 of the cutting devices 2, are embodied open in a circulating direction 10. In addition, the knife elements 6, 16 in the plan views of the top side 8 of the cutting devices 2 are of a sickle-shaped embodiment.

Both embodiments comprise radial conveying elements 12 arranged at the top side 8 and stationary relative to the knife elements 6, 16. The radial conveying elements in sections thereof are configured for conveying the crop plants in a conveying direction 14. In relation to the cutting rotation axis 4, the conveying direction 14 is oriented partly tangentially 14.1 and partly radially 14.2 in relation to the cutting rotation axis 4.

Each of the illustrated radial conveying elements 12 adjoins along a conveying contour 20 an intermediate element 22 which is arranged upstream in the circulating direction 10. A conveying section 24 of the conveying contour 20 extends from a neutral conveying point X partly in the circulating direction 10 and partly in radial direction away from the rotation axis 4. The radial conveying elements 12 are embodied to project by 6 mm in relation to the adjoining intermediate elements 22 in axial direction (compare FIGS. 1b and 4b). A material thickness of the intermediate element 22 measured in the axial direction matches a material thickness of the radial conveying element 12 measured in the axial direction and amounts to 3 mm.

Figure 5:
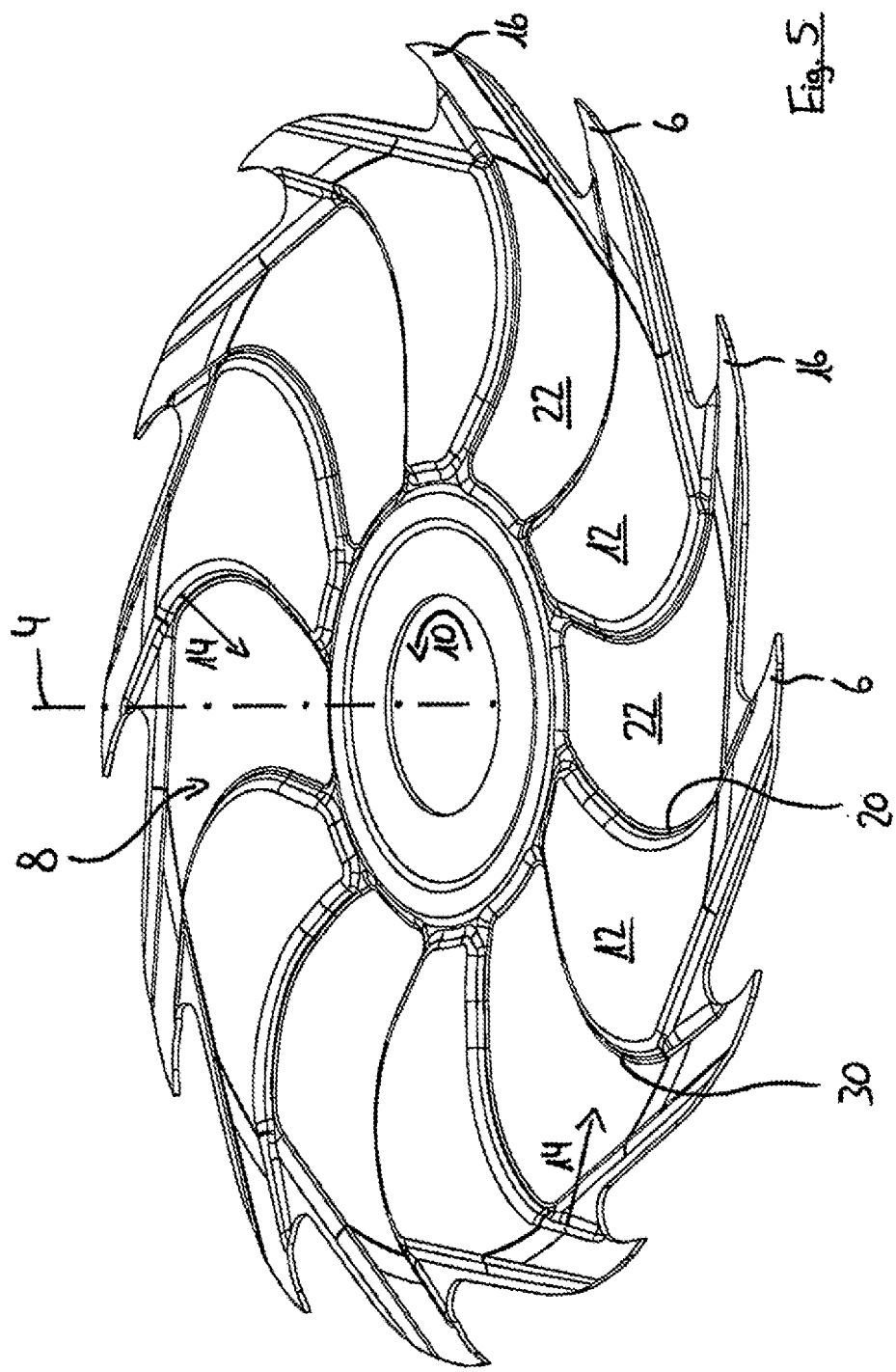
FIG. 5 shows the second embodiment in a perspective view.
Figure 6:
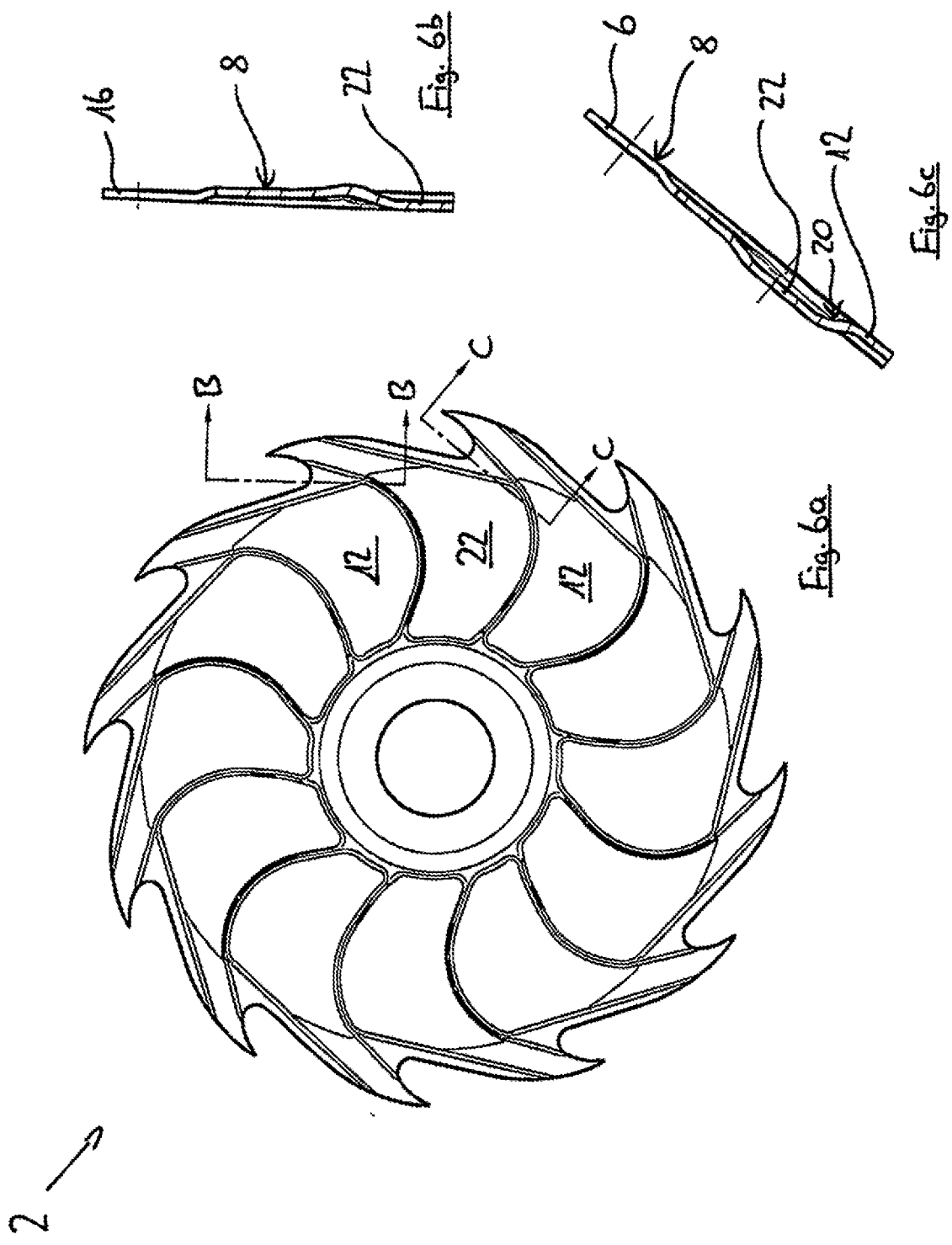

The conveying sections 24 in the plan views are embodied in an arc shape such that a conveying angle α between a conveying tangent line ZT of the conveying section 24 and a radial R intersecting the neutral conveying point X of the conveying section 24 increases with increasing radius, i.e., distance from the cutting rotation axis 4 (compare FIGS. 3a and 6a). In addition to the conveying section 24, the illustrated conveying contours 20 each have a discharge section 34 which extends partly opposite to the circulating direction 10 and partly in radial direction away from the cutting rotation axis 4 and forms a discharge angle R between a discharge tangent line AT and the radial R. The discharge sections 34 are arranged between the cutting rotation axis 4 and the respective adjoining conveying section 24 and adjoin at the neutral conveying point X one of the conveying sections 24. Every second one of the knife elements 6, 16 has correlated therewith a radial conveying element 12 (compare in particular FIGS. 2 and 5). It is however also possible that every third, every fourth or every sixth knife element 6, 16 has correlated therewith a radial conveying element.

Both embodiments of the cutting device 2 according to the invention are embodied for mounting in a first mounting position (compare FIGS. 7 and 8) as well as for mounting in a second mounting position in which the circulating direction 10 is opposite to that in the first mounting position. In the first mounting position, the top side 8 which is embodied as a first top side is at least partly oriented upwardly. In the second mounting position, a second top side 18 of the cutting device 2 which is oppositely positioned to the first top side 8 is at least partly oriented upwardly.

The illustrated intermediate elements 22 adjoin each along an intermediate contour 30 a further radial conveying element 12 which is arranged upstream in the circulating direction 10. In the plan views of the first top side 8 (compare FIGS. 1a, 3a, 4a, 6a), the course of the intermediate contour 30 matches the course of the conveying contour 20. In axial direction opposite to the intermediate contour 30 of the first top side 80, a conveying contour 20 is formed at the second top side 18.

The second embodiment of the cutting device 2 has two different groups of knife elements 6, 16. The cutting edges of the knife elements 6 of a first group are arranged displaced relative to the cutting edges of the knife elements 16 of the second group in axial direction (compare FIG. 4b, FIG. 6b, and FIG. 6c). In this context, the knife elements 6, 16 of the different groups alternate in circulating direction 10. In contrast thereto, in the first embodiment, all knife elements 6 are arranged at the same medium axial height (compare FIGS. 1b, 3b, and 3c).

Both embodiments comprise, between their cutting rotation axis 4 and the radial conveying and intermediate elements 12, 22, a groove 32 extending in circulating direction 10 and illustrated in FIGS. 1b and 4b.

Figure 7:
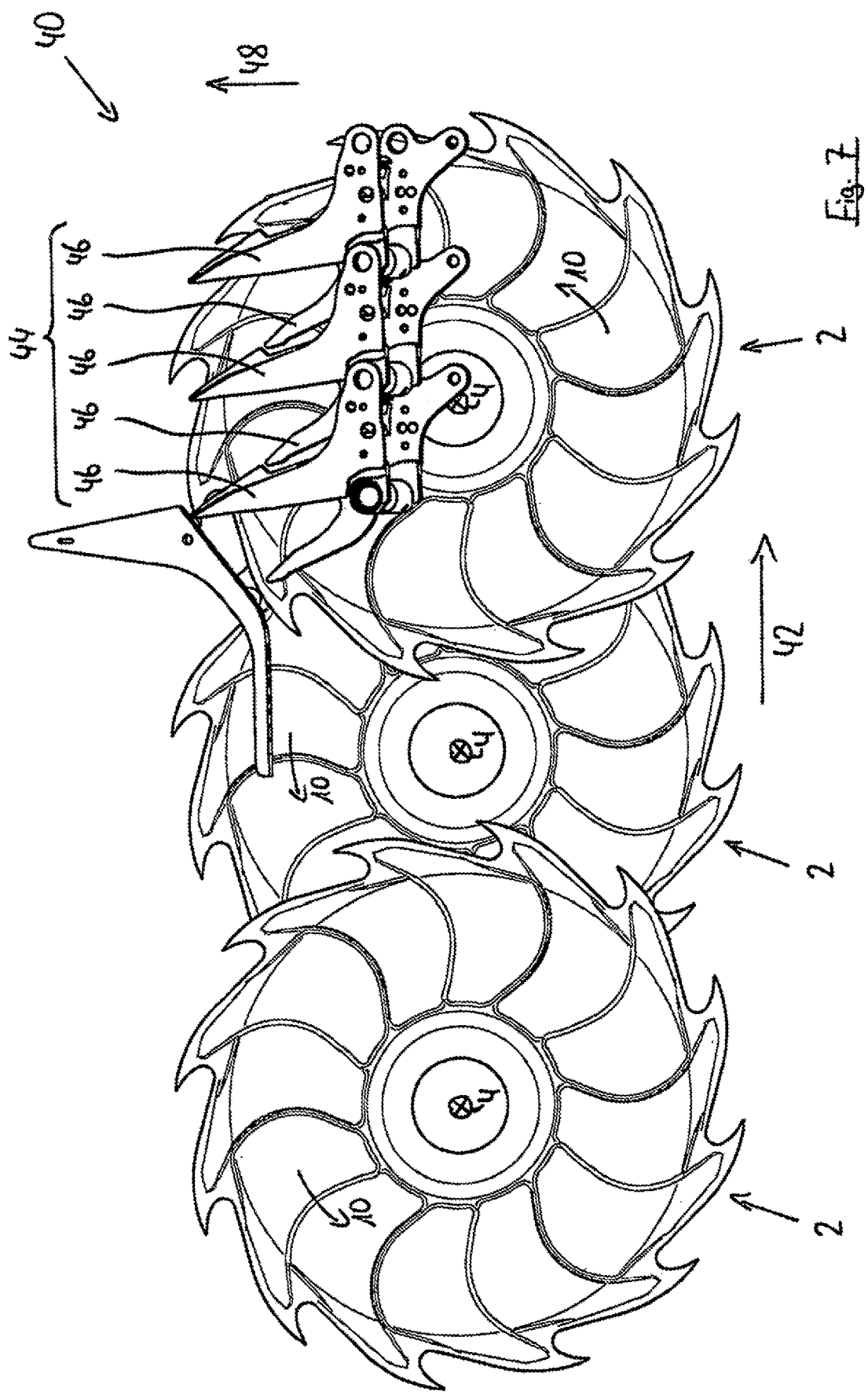
FIG. 7 shows a first embodiment of a harvesting attachment according to the invention in a partially illustrated plan view.
Figure 8:
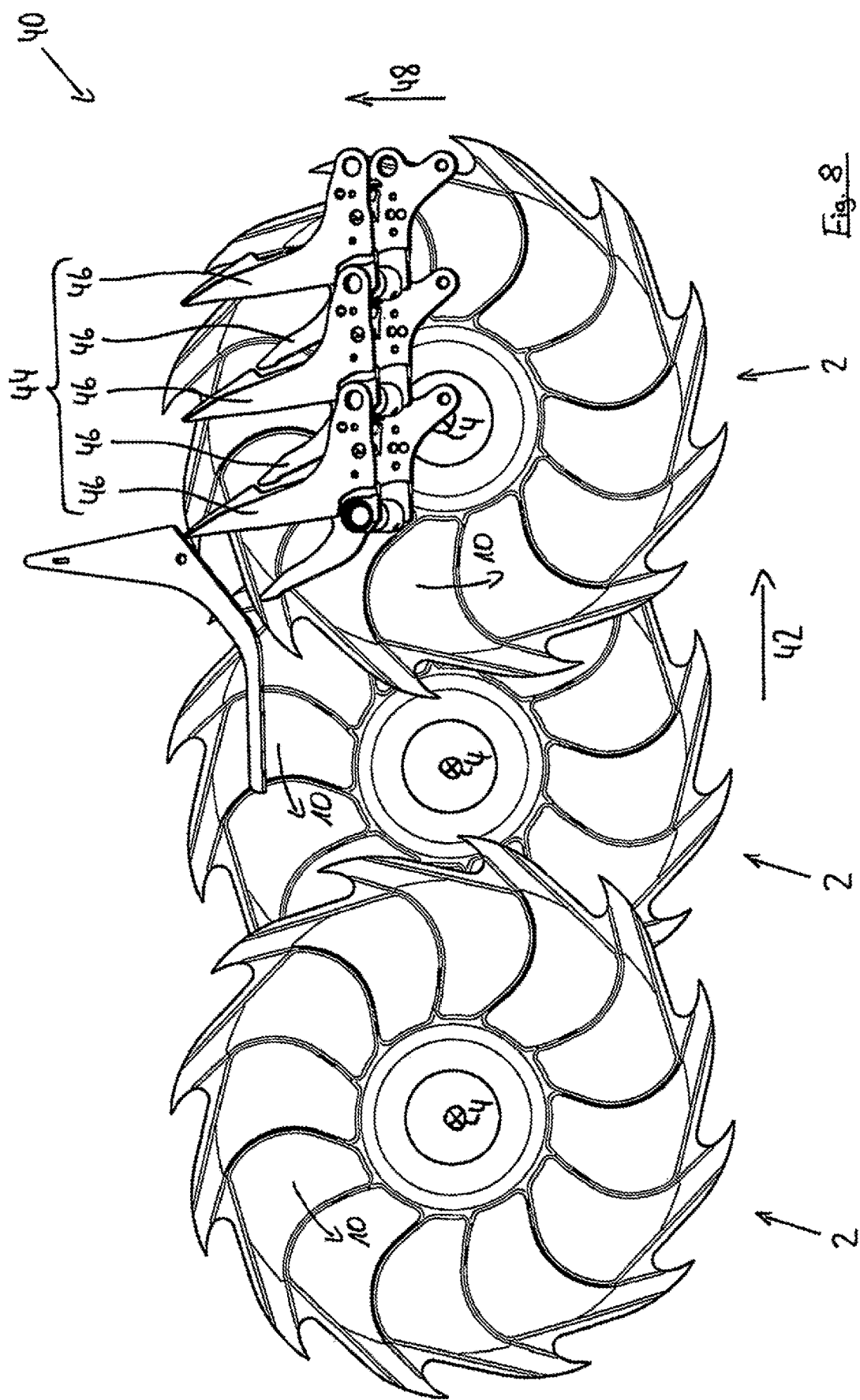
FIG. 8 shows a second embodiment of a harvesting attachment according to the invention in a partially illustrated plan view.

FIG. 7 shows a harvesting attachment 40 according to the invention, illustrated only partially here, with cutting devices 2 according to the first embodiment (FIGS. 1a to 3c). FIG. 8 shows a further harvesting attachment 40 according to the invention, illustrated also only partly, with cutting devices 2 according to the second embodiment (FIGS. 4a to 6c). The cutting devices 2 illustrated in FIGS. 7 and 8 are arranged in the same mounting position in this context.

The illustrated harvesting attachments 40 are embodied for agricultural harvesters, in particular for harvesting corn or grain. The illustrated cutting devices 2 are supported rotatably relative to a harvesting attachment frame, not shown. The cutting rotation axes 4 of the cutting devices 2 are spaced apart from each other in a transverse direction 42. The illustrated harvesting attachments 40 comprise a follower device 44 which is circulating in operation and is illustrated only partly. The follower devices 44 comprise above the cutting devices 2 two arranged follower elements 46 for conveying the cut-off crop plants in the transverse direction 42. The cutting devices 2 are partly arranged upstream of the follower device 44 in a driving direction 48 for harvesting.

What is claimed is:

1. A cutting device for cutting agricultural crop plants, the cutting device comprising:
    a knife element;
    a radial conveying element stationary relative to the knife element;
    wherein the cutting device is configured to rotate in a circulating direction about a cutting rotation axis for cutting the agricultural crop plants;
    wherein, in a plan view of a first top side of the cutting device, the knife element is embodied open in the circulating direction;
    wherein the radial conveying element is arranged at the first top side of the cutting device and is configured, at least in sections thereof, to convey the agricultural crop plants in a conveying direction that is oriented, relative to the cutting rotation axis, partly tangentially and partly radially in a radial direction in relation to the cutting rotation axis;
    wherein the radial conveying element is a first corrugated monolithic region of the cutting device, wherein the first corrugated monolithic region starts from a region of a medium height of the cutting device;
    the cutting device further comprising an intermediate element, wherein the radial conveying element comprises a conveying contour and adjoins the intermediate element along the conveying contour, wherein the intermediate element is arranged upstream of the radial conveying element in the circulating direction, wherein the conveying contour comprises a neutral conveying point and a conveying section that extends away from the neutral conveying point partly in the circulating direction and partly in the radial direction away from the cutting rotation axis;
    wherein the conveying contour comprises a discharge section and the discharge section extends partly opposite to the circulating direction and partly in the radial direction away from the cutting rotation axis, wherein the discharge section is arranged between the cutting rotation axis and the conveying section.

2. A cutting device for cutting agricultural crop plants, the cutting device comprising:
    a knife element;
    a radial conveying element stationary relative to the knife element;
    wherein the cutting device is configured to rotate in a circulating direction about a cutting rotation axis for cutting the agricultural crop plants;
    wherein, in a plan view of a first top side of the cutting device, the knife element is embodied open in the circulating direction;
    wherein the radial conveying element is arranged at the first top side of the cutting device and comprises a conveying contour;
    wherein the conveying contour is configured, at least in sections thereof, to convey the agricultural crop plants in a conveying direction that is oriented, relative to the cutting rotation axis, partly tangentially and partly radially in a radial direction in relation to the cutting rotation axis;
    wherein the conveying contour comprises a concave shape and the concave shape faces in the circulating direction;
    the cutting device further comprising an intermediate element, wherein the conveying contour adjoins the intermediate element along the conveying contour, wherein the intermediate element is arranged upstream of the radial conveying element in the circulating direction, wherein the conveying contour comprises a neutral conveying point and a conveying section that extends away from the neutral conveying point partly in the circulating direction and partly in the radial direction away from the cutting rotation axis;
    the cutting device further comprising another one of the radial conveying element arranged upstream in the circulating direction of the intermediate element, wherein the intermediate element comprises an intermediate contour and adjoins said another one of the radial conveying element along the intermediate contour, wherein, in the plan view of the first top side of the cutting device, a course of the intermediate contour matches a course of a conveying contour of said another one of the radial conveying element.

3. A cutting device for cutting agricultural crop plants, the cutting device comprising:
    a knife element;
    a radial conveying element stationary relative to the knife element;
    wherein the cutting device is configured to rotate in a circulating direction about a cutting rotation axis for cutting the agricultural crop plants;
    wherein, in a plan view of a first top side of the cutting device, the knife element is embodied open in the circulating direction;
    wherein the radial conveying element is arranged at the first top side of the cutting device and is configured, at least in sections thereof, to convey the agricultural crop plants in a conveying direction that is oriented, relative to the cutting rotation axis, partly tangentially and partly radially in a radial direction in relation to the cutting rotation axis;
    wherein the radial conveying element is a first corrugated monolithic region of the cutting device, wherein the first corrugated monolithic region starts from a region of a medium height of the cutting device;
    wherein the cutting device comprises a plurality of the knife element, including a first knife element and a second knife element adjacently arranged to the first knife element in the circulating direction, wherein at least a part of a cutting edge of the first knife element is arranged displaced in an axial direction of the cutting rotation axis relative to at least a part of a cutting edge of the second knife element.

4. The cutting device according to claim 3, further comprising an intermediate element, wherein the radial conveying element comprises a conveying contour and adjoins the intermediate element along the conveying contour, wherein the intermediate element is arranged upstream of the radial conveying element in the circulating direction, wherein the conveying contour comprises a neutral conveying point and a conveying section that extends away from the neutral conveying point partly in the circulating direction and partly in the radial direction away from the cutting rotation axis.

5. The cutting device according to claim 4, wherein the intermediate element is a second corrugated monolithic region of the cutting device, wherein the second corrugated monolithic region starts from a region of a medium height of the cutting device.

6. The cutting device according to claim 3, wherein the cutting device comprises a second top side that is oppositely positioned to the first top side, wherein the cutting device is configured to be mounted in a first mounting position, in which the first top side is oriented at least partly upwardly, and is configured to be mounted in a second mounting position, in which the second top side is oriented at least partly upwardly.

7. A cutting device for cutting agricultural crop plants, the cutting device comprising:
   a knife element;
   a radial conveying element stationary relative to the knife element;
   wherein the cutting device is configured to rotate in a circulating direction about a cutting rotation axis for cutting the agricultural crop plants;
   wherein, in a plan view of a first top side of the cutting device, the knife element is embodied open in the circulating direction;
   wherein the radial conveying element is arranged at the first top side of the cutting device and comprises a conveying contour;
   wherein the conveying contour is configured, at least in sections thereof, to convey the agricultural crop plants in a conveying direction that is oriented, relative to the cutting rotation axis, partly tangentially and partly radially in a radial direction in relation to the cutting rotation axis; and
   wherein the conveying contour comprises a concave shape and the concave shape leads in the circulating direction.

8. The cutting device according to claim 7, wherein the radial conveying element, at least in sections, has a sickle shape.

9. The cutting device according to claim 7, comprising a plurality of the knife element and a plurality of the radial conveying element, wherein at least every fourth one of the plurality of the knife element has correlated therewith one of the plurality of the radial conveying element.

10. The cutting device according to claim 9, wherein every second one of the plurality of the knife element has correlated therewith one of the plurality of the radial conveying element.

11. The cutting device according to claim 7, further comprising an intermediate element, wherein the radial conveying element comprises a conveying contour and adjoins the intermediate element along the conveying contour, wherein the intermediate element is arranged upstream of the radial conveying element in the circulating direction, wherein, in an axial direction of the cutting rotation axis, the conveying contour is embodied at a second top side opposite to the intermediate contour at the first top side.

12. The cutting device according to claim 7, further comprising at least one groove arranged between the cutting rotation axis and the radial conveying element and extending circumferentially in the circulating direction.

13. A harvesting attachment for an agricultural harvester, the harvesting attachment comprising:
   a plurality of the cutting device according to claim 7 rotatably supported such that the cutting rotation axes of the plurality of the cutting device are spaced apart from each other in a transverse direction of the harvesting attachment;
   at least one follower device configured to circulate in operation and comprising follower elements arranged above the plurality of the cutting device for conveying the cut crop plants in the transverse direction.

14. The harvesting attachment according to claim 13, wherein the conveying contour of the radial conveying element of at least one of the plurality of the cutting device is arranged at least partly upstream of the follower device in a driving direction for harvesting, wherein said conveying contour extends to a point below the follower elements.

15. A field chopper comprising:
   a harvesting attachment comprising:
      a plurality of the cutting device according to claim 7 rotatably supported such that the cutting rotation axes of the plurality of the cutting device are spaced apart from each other in a transverse direction of the harvesting attachment;
      at least one follower device configured to circulate in operation and comprising follower elements arranged above the plurality of the cutting device for conveying the cut crop plants in the transverse direction.

16. The cutting device according to claim 7, further comprising an intermediate element, wherein the conveying contour adjoins the intermediate element along the conveying contour, wherein the intermediate element is arranged upstream of the radial conveying element in the circulating direction, wherein the conveying contour comprises a neutral conveying point and a conveying section that extends away from the neutral conveying point partly in the circulating direction and partly in the radial direction away from the cutting rotation axis.

17. The cutting device according to claim 16, wherein a material thickness of the intermediate element, measured in an axial direction of the cutting rotation axis, at least substantially matches a material thickness of the radial conveying element measured in the axial direction.

18. The cutting device according to claim 16, wherein the conveying section, in the plan view of the first top side of the cutting device, has an arc shape such that a conveying angle between a radial intersecting the neutral conveying point and the conveying section increases with an increasing radius of the cutting device.

19. The cutting device according to claim 16, wherein the radial conveying element is a first corrugated monolithic region of the cutting device, wherein the first corrugated monolithic region starts from a region of a medium height of the cutting device; and wherein the intermediate element is a second corrugated monolithic region of the cutting device, wherein the second corrugated monolithic region starts from a region of a medium height of the cutting device.

20. A cutting device for cutting agricultural crop plants, the cutting device comprising:
   a knife element;
   a radial conveying element stationary relative to the knife element;
   wherein the cutting device is configured to rotate in a circulating direction about a cutting rotation axis for cutting the agricultural crop plants;
   wherein, in a plan view of a first top side of the cutting device, the knife element is embodied open in the circulating direction;
   wherein the radial conveying element is arranged at the first top side of the cutting device and comprises a conveying contour;
   wherein the conveying contour is configured, at least in sections thereof, to convey the agricultural crop plants in a conveying direction that is oriented, relative to the cutting rotation axis, partly tangentially and partly radially in a radial direction in relation to the cutting rotation axis; and wherein the conveying contour comprises a concave shape and the concave shape faces in the circulating direction;

wherein the cutting device comprises a second top side that is oppositely positioned to the first top side, wherein the cutting device is configured to be mounted in a first mounting position, in which the first top side is oriented at least partly upwardly, and is configured to be mounted in a second mounting position, in which the second top side is oriented at least partly upwardly.

* * * * *